United States Patent [19]

Johnson

[11] Patent Number: 4,566,029

[45] Date of Patent: Jan. 21, 1986

[54] SHUTTERED CCD CAMERA WITH LOW NOISE

[75] Inventor: Cydney A. Johnson, Marlton, N.J.

[73] Assignee: RCA Corporation, Princeton, N.J.

[21] Appl. No.: 592,839

[22] Filed: Mar. 23, 1984

[51] Int. Cl.⁴ .................... H04N 9/09; H04N 9/04; H04N 9/07; H04N 5/225

[52] U.S. Cl. ........................................ 358/50; 358/41; 358/43; 358/55; 358/209; 358/225; 358/229

[58] Field of Search ............... 358/41, 42, 43, 44, 358/45, 46, 47, 48, 49, 50, 51, 52, 53, 54, 55, 209, 213, 225, 228, 229, 909

[56] References Cited

U.S. PATENT DOCUMENTS

| | | | |
|---|---|---|---|
| 3,600,504 | 8/1971 | Reilly | 358/42 |
| 3,603,722 | 9/1971 | Graham | 358/42 |
| 4,125,857 | 11/1978 | Sarson et al. | 358/42 |
| 4,200,934 | 4/1980 | Hofmann | 358/163 |
| 4,471,388 | 9/1984 | Dischert | 358/906 |

FOREIGN PATENT DOCUMENTS 2802670 7/1979 Fed. Rep. of Germany .

*Primary Examiner*—Michael A. Masinick
*Assistant Examiner*—Randall S. Svihla
*Attorney, Agent, or Firm*—Eugene M. Whitacre; William H. Meise

[57] ABSTRACT

A television camera having solid-state imagers has a motor-driven shutter disc for reducing highlight smear during the pull-down transfer interval. The shutter disc diameter is reduced to minimize stored energy and synchronization time. Because of the small shutter diameter, the drive motor is near the imagers. Low-level noise at the shutter rotational rate is coupled to the imagers, and is rendered visible because it is coherent with the field rate. The noise is reduced by means of an ungrounded conductive shield surrounding the motor. Noise is reduced by placing imager contributing the greatest luminance component furthest from the motor.

11 Claims, 5 Drawing Figures

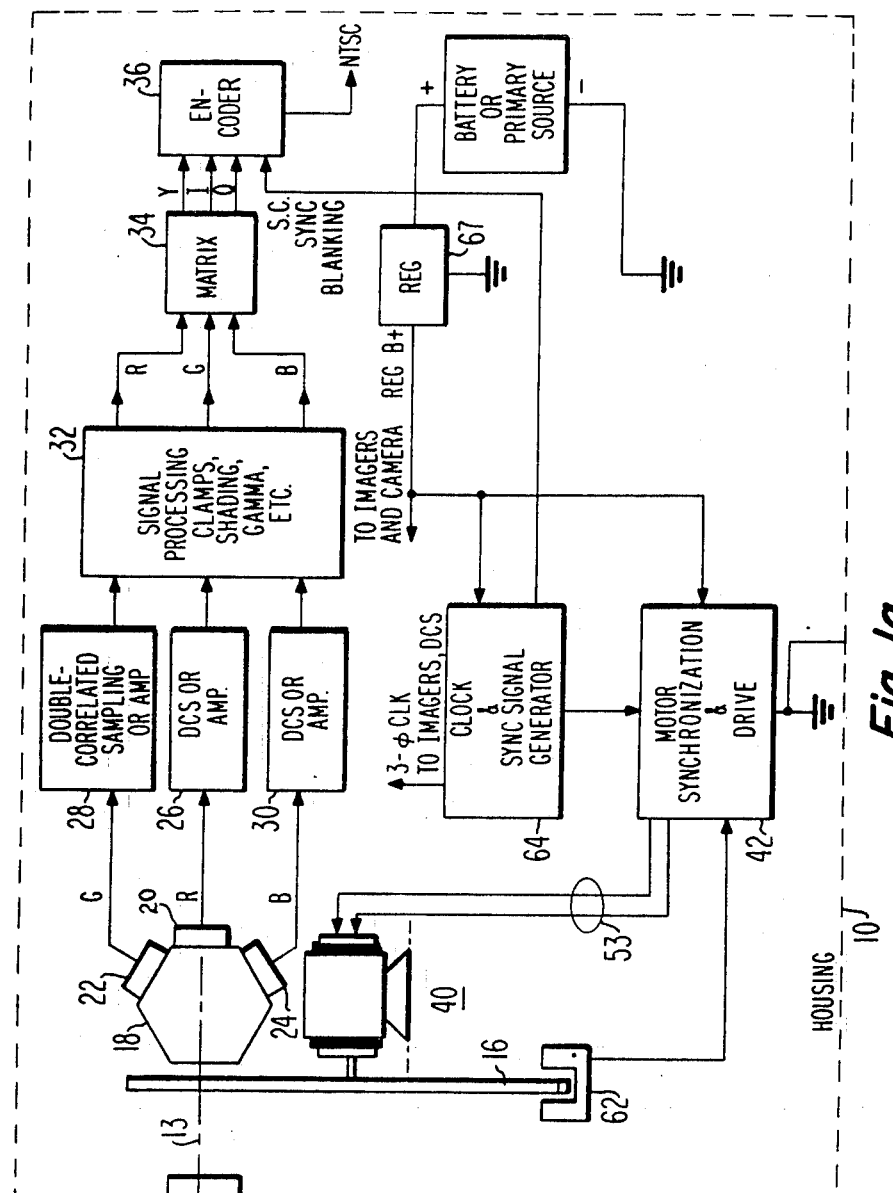
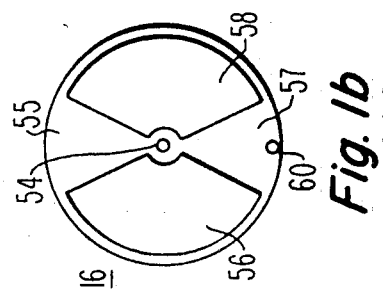
Fig. 1a
Fig. 1b

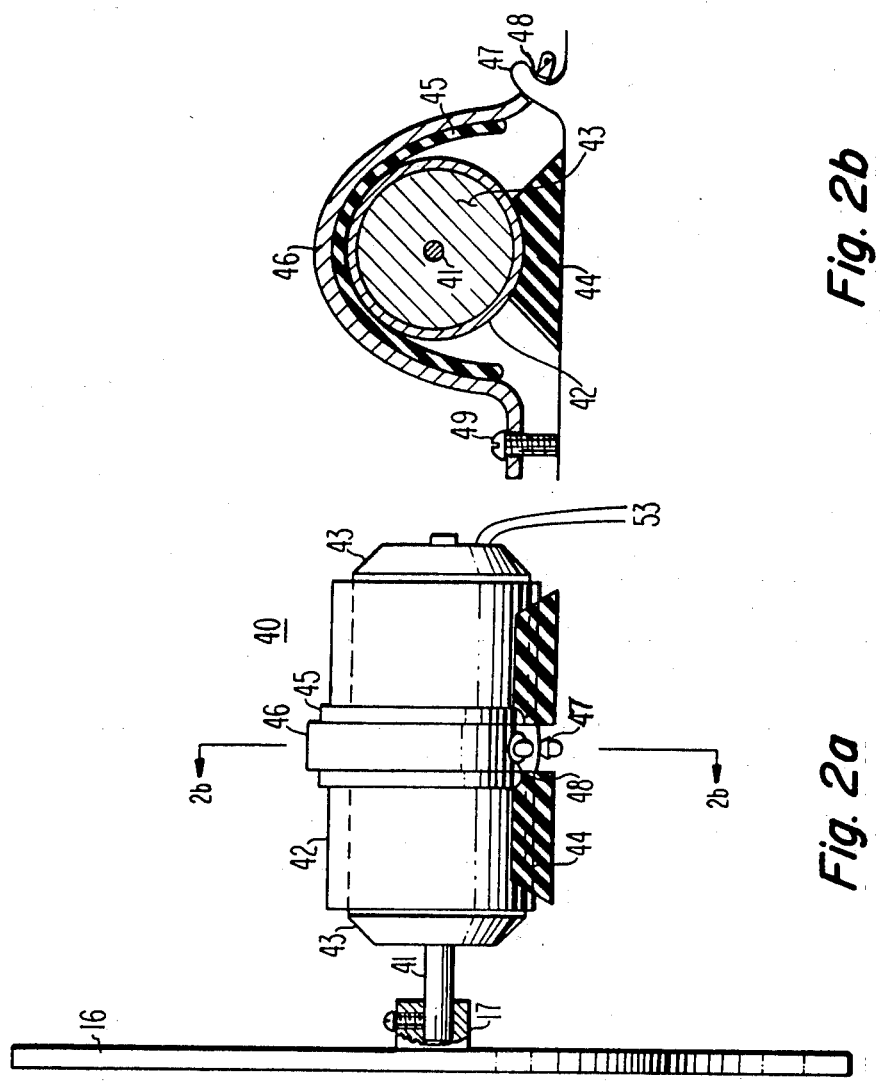

SHUTTERED CCD CAMERA WITH LOW NOISE

This invention relates to solid-state television cameras having smear-reducing optical shutters and low noise.

Television cameras having solid-state imagers are coming onto the market. The imagers in most of these cameras consist of MOS sensor arrays within which signal represented by charge integrated during an integrating interval is read from the imager by transferring the charge to a channel immediately adjacent to the charge-collecting site, or possibly within a very few lines of the charge-collecting site, which channel is protected from light by a mask. Such imagers suffer from relatively poor sensitivity to light, because a substantial portion of the surface upon which the image is focused consists of non-active masked areas.

Other solid-state cameras use charge-coupled devices of the field-transfer type, in which the entire "A register" surface upon which the image is focused is active to generate photoelectrons, which are constrained within collection sites by a combination of vertical channel stops which prevent the leakage of current outside of a vertical channel, and charged electrodes to which voltages are applied to establish the size and location of the collection sites. In such field-transfer imagers, the photoelectron charge accumulated in the collection sites of the "A" register is periodically transferred along the channels by varying the voltages applied to the electrodes during a "pull-down" interval to transfer the charge to a storage register known as the "B" register. For the B register, the charge is transferred in parallel to a "C" register, from which it is serially transferred to a low noise amplifier or the equivalent for increasing the level of the signal with very low noise. It is known to use double-correlated sampling for processing the signals extracted from the C register to produce a continuous analog signal representative of the image being televised.

The field transfer imagers are very advantageous in terms of sensitivity to light, because the entire surface of the A register is active for collecting photoelectrons, unlike the other types of imagers. The field-transfer operation necessarily results in unobvious smearing of the image, since photoelectrons are generated during the pulldown interval at all points in the "A" register onto which light falls. The field transfer CCD imager has the disadvantage that highlights in the image can cause obvious vertical smearing or bright vertical areas above and below the image of the highlight as viewed on the reproduced raster, due to generation of photoelectrons in the channels of the A register onto which the highlight is focussed during the pull-down interval. Furthermore, this smearing splits when the camera is panned. While in theory other types of imagers such as the line transfer type do not suffer from this smearing, in actual practice smearing does occur due to leakage of light under the masked portion of the transfer channels. It is known to use optical shutters to reduce vertical transfer smear. The shutter is formed from an opaque portion which is interposed between the image and the active "A" portion of the imager during the transfer interval or pull-down interval to block any light which may fall onto the active portion from a highlight, thereby preventing the generation of excessive photoelectrons which might cause vertical smear. During the active interval of the imager operating cycle in which light integration for generation of photoelectrons takes place, the shutter is removed or a transparent portion is substituted for the opaque portion, so that light can fall from the image onto the imager.

Such shutters are generally rotary shutters having an opaque portion and a portion through which light can pass. For example, it is known to use a circular glass plate with a segment rendered opaque by paint or a like material, and to rotate the shutter about its axis in such a fashion that the opaque portion and transparent portion of the plate are recurrently interposed in the light path of the optics of the camera. It is also known to synchronize the rotation of the shutter with the operating cycle of the imager by use of a phase-lock loop so that the opaque portion blocks light during the pulldown interval.

It is desirable to reduce the power requirements of a camera which uses charge-coupled imagers and a shutter. This is especially true in portable cameras, which are intended to be powered from a battery. For portable use, small size and light weight are also of paramount importance. The small size and light weight is accomplished by making the color-splitting prism as small as possible, commensurate with the size of the imagers, so that the combination of prism and three imagers has a volume of approximately one cubic inch, which is much less than that of the prisms required for the camera tubes used in earlier generations of equipment. Power requirements are minimized by making the rotary shutter of as light a material as possible to minimize the inertial forces which occur when it rotates and to minimize the energy that must be transferred from the battery or other power source to the rotary shutter to bring it up to speed. Thus, the axis of the shutter must be as close as possible to the axis of the prism and imagers so that the radius of the shutter disc can be reduced to the minimum possible. Since the axis of the shutter is very close to the optical axis, the drive motor for the shutter must also be miniaturized, otherwise its bulk will also block light or, alternatively, force the radius of the shutter disc to be increased. A large shutter disc may have the additional disadvantage of requiring a large bump or extension on the housing to accomodate its bulk, whereas a small disc may require a small bump or none at all.

When such a compact arrangement is operated, it is unexpectedly found that the signal derived from the imagers contains noise related to the rotational rate of the shutter, notwithstanding that the motor has a conductive cylindrical shield which is grounded to the camera case. This noise is coherent, in that when the shutter is synchronized with the imager clock and sync signals it appears as several faint thin horizontal lines which are stationary. When the shutter is unsynchronized, the noise is distributed over the surface of the raster and is essentially invisible. A high-performance solid-state television camera is desired which operates with low noise.

SUMMARY OF THE INVENTION

A television camera includes a solid-state imager coupled to receive light from an image and a rotary shutter including opaque and light-passing portions coupled in the light path for passing light during integrating intervals and for blocking light during transfer intervals. The shutter is driven by a motor in turn driven by circuits synchronized with the imager transfer intervals. The imagers and circuits are energized from a voltage source having a reference point. The motor is surrounded by a conductive shield. In order to reduce noise coupled into the imagers, the shield is isolated from the reference point. According to another embodiment of the invention, the green-responsive imager is located furthest from the shutter motor for reducing the amount of noise coupled to the imager making the greatest contribution to the luminance.

DESCRIPTION OF THE DRAWING

FIGS. 1a–1b illustrate in simplified block-diagram semi-pictorial form a television camera according to the invention; and FIGS. 2a–2b and 3 illustrate details of drive motor mounting arrangements for the camera of FIG. 1.

DESCRIPTION OF THE INVENTION

Figure 3:
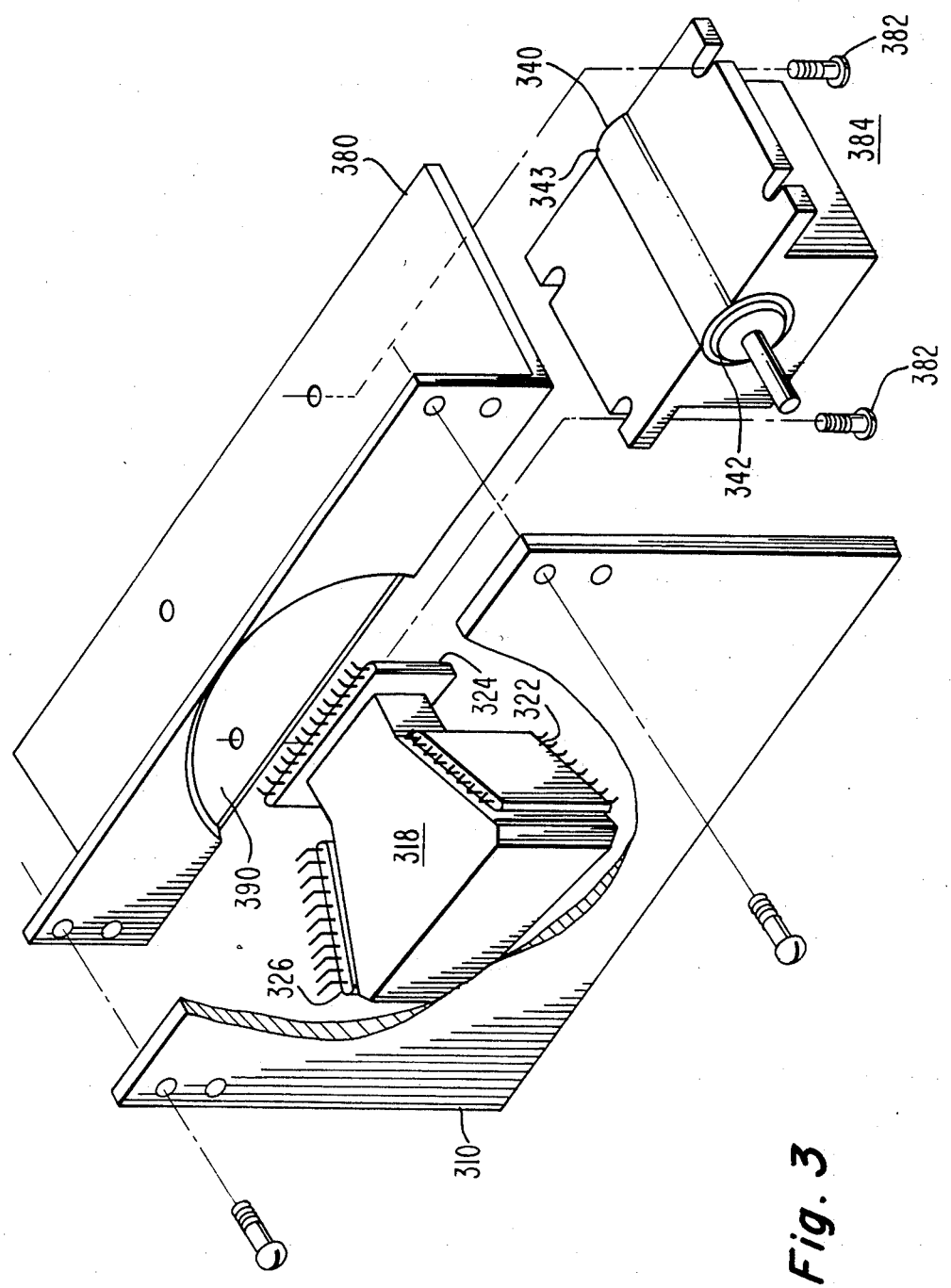

FIGS. 1a–1b illustrate a television camera having a housing designated generally as 10 on which is mounted a lens assembly illustrated as 12 which focuses an image illustrated as an arrow 14 past a rotary shutter 16 to a color-splitting prism 18 which splits the light from the image into its component colors such as red, green and blue (R, G, B) and applies the separate light components to individual red, green, and blue reponsive solid-state imagers 20, 22 and 24. The low-level output signals in the form of packets of charge from imagers 20, 22 and 24 are coupled to known arrangements for amplifying the signal to turn the small charge packets into a continuous baseband signal. Such known arrangements may include double-correlated sampling circuits illustrated as blocks 26, 28 and 30 or equivalent low-noise amplifiers. The amplified signals are applied to camera signal processing circuits illustrated together as a block 32, in which camera functions such as clamping, shading, gamma correction and the like can be accomplished to produce processed R, G, and B signals which are applied to a matrix 34 in which they are combined to produce Y (luminance) and I and Q color component signals. The Y, I and Q signals are applied to an encoder 36 which in addition to inserting sync and blanking signals into the Y, I and Q signals also amplitude-modulates the I and Q signals onto 90° phased subcarriers, adds the two amplitude modulated signals together, and sums them with the luminance and blanking signals to produce a standard NTSC signal, as known.

Shutter 16 is driven by a motor designated generally as 40 having a shaft 41 as illustrated in more detail in FIGS. 2a–2b. Motor 40 may be a brush-type direct-current motor such as type 16CL2501 manufactured by Namiki Precision Jewel Co. Ltd. of 8-22, 3-chome, Shinden, Adachi-ku, Tokyo 123, Japan, and of 15 Essex Road, Century Plaza 5th Floor, Paramus, N.J. 07652.

The shutter 16 includes a hub 17 which is fastened to shaft 41 for being driven thereby. Shutter 16 consists principally of a flat plate of thin sheet metal having a central aperture 54 for receiving the shaft, two butterfly-wing-shaped apertures 56 and 58 and a further circular aperture 60 for tachometer purposes. Apertures 56 and 58 when interposed in light path 13 allow light to pass from image 14 to the imagers for generating photoelectrons. Portions 55 and 57 of shutter 16 consist of unperforated metal and are therefore opaque when interposed in the light path 13. Aperture 60 coacts with an optical sensor 62 to produce an indication signal at a particular position of the shutter to allow motor synchronization in drive circuit 42 to control motor 40 via control lines 53 to maintain shutter 16 in synchronism with the operating cycle of the imagers. In particular, shutter 16 is arranged to interpose opaque portions 55 and 57 in light path 13 during the pull-down interval in which integrated signal light is transferred to storage registers. Motor synchronization and drive circuit 42 includes a phase-lock-loop (not shown) responsive to tachometer signals from optical sensor 62 and to signals from sync generator 64 which identify the pull-down interval for controlling the direct current (DC) to motor 40 to maintain shutter wheel 16 in proper phase. A primary power source such as a battery or AC-powered transformer-rectifier arrangement illustrated as a block 66 has one end grounded to the housing and one terminal coupled by way of a voltage regulator 67 to various portions of the camera requiring electrical energization, such as the imagers, clock and sync signal generator and motor synchronization and drive circuits.

Motor 40 includes electrical windings, magnets or field windings, brushes, and a commutator, as known, and includes a conductive metal cylinder surrounding the principal portion of the motor, by which mounting can be accomplished by a clamp which surrounds the motor and which attaches the motor to a portion of the housing. It has been discovered that a camera with such an arrangement, while functional, exhibits a noise related to the rotational rate of shutter 16. Moving the motor location away from the imagers reduces the noise but requires that the radius of the shutter be increased so as to continue to interpose the appropriate light-passing and light-blocking portions of the shutter in the light path. This larger shutter diameter in turn undesirably results in greater power consumption as energy is stored in the rotating shutter, and for a given motor size and available torque a longer time elapses between turn-on of the system and the time at which the shutter comes up to synchronous speed. Until synchronous speed is obtained, the shutter will go into and out of synchronism (sync) with the operating cycle of the imagers, which will undesirably result in alternating light and dark images.

FIGS. 2a–2b illustrate details of a mounting arrangement for motor 40 which substantially reduces the undesirable noise at the shutter rotation rate. Conductive metal cylinder 42 substantially surrounding the principal portion of motor 40 is electrically isolated and supported from the rest of the motor by an insulator 43, which also supports the bearings upon which shaft 41 turns. A clamp 46 having an aperture 48 is hooked over a kickup 47 formed in the chassis, and clamps the motor to the chassis by means of a screw 49. In order to electrically isolate conductive cylinder 42 from ground, an insulator 44 stands the cylinder away from the chassis housing and a further insulator 45 prevents electrical contact between the housing and conductive cylinder 42 by way of clamp 46. With the conductive cylinder 42 isolated from ground, the electrical noise is substantially reduced. It is not known exactly why this occurs, but it is believed that when the conductive cylinder is grounded it acts as an antenna at the low rotation frequency (3600 Hz) and radiates to the imagers. When the cylinder is isolated, the capacitance between the imagers and the motor windings and brushes is turned into two series capacitances, one between the windings/brushes and the cylinder, and another between the cylinder and the imagers, which together have less capacitance than the single corresponding capacitance.

FIG. 3 illustrates in perspective view another mounting arrangement for the shutter motor. In FIG. 3, a housing 310 supports a prism 318 which has glued to its R, G and B ports solid-state imagers (not shown) borne by carriers 322, 324 and 326, which are in the form of integrated-circuit carriers having dual-in-line (DIP) pins. Housing 310 is perforated for mounting of a support plate 380, which in turn is perforated for providing a mounting for screws 382 (only two shown) for attaching a motor mounting block designated generally as 384 which has a hole formed therein of a size just larger than the outer diameter of insulator 343 surrounding motor 340. Thus, motor 340 and its conductive cylinder 342 are electrically isolated from, but mechanically coupled to and supported by motor block 384. When block 384 is screwed to the bottom of the plate 380, the part of the cylinder insulator 343 near the plate 380 provides electrical isolation. Aperture 390 provides clearance for the shutter disc (not shown).

In accordance with another aspect of the invention, the locations of the imagers are selected for least noise based upon their relative contributions to the luminance-representative signal. For example, the blue-representative signal makes the least contribution to the luminance, so it is placed relatively closest to the motor (40 or 340) of the three imagers. The noise introduced decreases with increasing separation. Thus, of the noise which is introduced into the imagers, the largest amount of noise will be introduced into the imager of the channel (blue) in which it has the least effect upon the luminance. If possible, of the remaining two imagers (green and red) the green should be located furthest from motor 40 so as to receive least noise from the shutter motor, since a green-responsive imager produces the signal which makes the greatest contribution to the luminance signal.

Other embodiments of the invention will be obvious to those skilled in the art. For example, if the camera includes a G-representative imager and one imager for combined R and B, the G-representative imager should be furthest from the motor. If there are two green-representative imagers, they should be furthest from the motor. The energizing power supply may have both positive and negative supplies referenced to the housing or chassis ground. The signal processing may be analog or digital, parallel or sequential.

What is claimed is:

1. A television camera comprising:
   charge-coupled imaging means coupled to receive light from an image for generating low-level signals therefrom, said imaging means being subject to smear in the presence of an illumination highlight which detracts from the appearance of the televised image;
   shutter means coupled in the light path from said image to said imaging means, said shutter means including an opaque portion for cutting off said light from said image, and including a light-passing portion for transmitting said light from said image to said imaging means;
   energizing means coupled to said charge-coupled imaging means for energizing said imaging means for allowing integration of signal-representative charges;
   synchronizing means coupled to said energizing means for being energized thereby and coupled to said imaging means for recurrently clocking said signal-representative charges to form a recurrent stream of said low-level signals;
   amplifying means coupled to said imaging means for receiving said stream of low-level signals for amplifying said signals in a low-noise manner;
   shutter motor means electrically coupled to said energizing means for being energized thereby and coupled to said shutter means for causing said shutter means to move to successively interpose said opaque and transparent portions between said image and said imaging means, said shutter motor means being synchronized by said synchronizing means for interposing said opaque portions of said shutter means in said light path during recurrent pull-down intervals and for interposing said light-passing portions of said shutter means in said light path during intervals in which said signal-representative charges are clocked, whereby said motor means coupled to said shutter means is physically near said imaging means, and motor noise is undesirably radiated to said imaging means, which motor noise while small in magnitude is nevertheless significant relative to said low-level signals;
   conductive shielding means surrounding a substantial portion of said motor for providing shielding of said motor noise, whereby electrically connecting said shielding means to a point of reference potential for said energizing means unexpectedly perturbs the shielding; and
   electrical isolating means coupled to said motor and to said conductive shielding means for mechanically supporting said shielding means while providing electrical isolation of said shielding means from said energizing means whereby said shielding means is effective to reduce said motor noise.

2. A camera according to claim 1 wherein said shutter means comprises a perforated metal disc, said opaque portion corresponds to an unperforated portion of said disc and said light-passing portion includes a perforation.

3. A camera according to claim 1 wherein said energizing means comprises a battery.

4. A camera according to claim 1 wherein said synchronizing means includes an optical sensor.

5. A camera according to claim 4 wherein said shutter means comprises a light-passing portion coupled to said optical sensor.

6. A camera according to claim 1 wherein said motor means comprises a rotary direct-current motor.

7. A camera according to claim 1 wherein said conductive shielding means comprises a metal cylinder.

8. A camera according to claim 6 wherein said conductive shielding means surrounds substantially all of said motor means and provides an opening for a shaft of said motor means.

9. A camera according to claim 1 wherein said conductive shielding means is electrically isolated from a housing for said camera.

10. A camera according to claim 1 wherein said imaging means comprises red, green and blue-responsive imagers; and
    said motor means is physically located closest to said blue-responsive imager whereby maximum noise is coupled to said blue-responsive imager and is less visible in the resulting image than if coupled to said red- or green-responsive imagers.

11. A television camera, comprising:
    an optical system;
    first solid-state imaging means optically coupled to said optical system and responsive to a first component of light from an image being televised to form a signal representative thereof;

second solid-state imaging means optically coupled to said optical system and responsive to at least a second component of light from said image being televised to form a signal representative thereof, to which second component of light the eye is less sensitive than to said first component;

shutter means optically coupled to said optical system for blocking and unblocking a light path therethrough; and shutter motor means mechanically coupled to said shutter means for mechanical drive thereof, said motor means being physically located nearer to said second imaging means than to said first imaging means so that motor noise induced into said first and second imaging means principally affects the signal from said second imaging means, representative of said second component of light to which the eye is less sensitive than to said first component, and thereby minimizes the effect thereof.

* * * * *